(12) United States Patent
Wolfe et al.

(10) Patent No.: US 8,838,797 B2
(45) Date of Patent: Sep. 16, 2014

(54) DYNAMIC COMPUTATION ALLOCATION

(75) Inventors: Andrew Wolfe, Los Gatos, CA (US); Thomas Martin Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 572 days.

(21) Appl. No.: 12/500,667

(22) Filed: Jul. 10, 2009

(65) Prior Publication Data
US 2011/0010455 A1   Jan. 13, 2011

(51) Int. Cl.
*G06F 15/16* (2006.01)
*G06F 15/173* (2006.01)
*G06F 9/50* (2006.01)
*G06F 9/00* (2006.01)

(52) U.S. Cl.
CPC ............... *G06F 9/5044* (2013.01); *G06F 9/00* (2013.01)
USPC ............ 709/226; 709/203; 709/219; 709/235

(58) Field of Classification Search
CPC ..... G06F 1/3212; G06F 1/329; G06F 9/5016; G06F 9/505; G06F 9/5072; G06F 9/5094; H04L 12/5695; H04L 29/08144; H04L 29/08171
USPC ................................................. 709/203, 226
See application file for complete search history.

(56) References Cited

U.S. PATENT DOCUMENTS

| | | | |
|---|---|---|---|
| 7,519,717 B2 | 4/2009 | Stanford-Clark et al. | |
| 7,548,977 B2 * | 6/2009 | Agapi et al. | 709/226 |
| 7,668,939 B2 * | 2/2010 | Encarnacion et al. | 709/220 |
| 7,689,717 B1 * | 3/2010 | Munshi et al. | 709/246 |
| 7,703,102 B1 * | 4/2010 | Eppstein et al. | 718/104 |
| 7,704,147 B2 * | 4/2010 | Quraishi et al. | 463/42 |
| 7,719,540 B2 * | 5/2010 | Piazza et al. | 345/557 |
| 7,756,966 B2 * | 7/2010 | Callaghan | 709/223 |
| 7,774,571 B2 * | 8/2010 | Benhase et al. | 711/170 |
| 7,783,695 B1 * | 8/2010 | Tyrrell et al. | 709/201 |
| 7,843,876 B2 * | 11/2010 | Holt et al. | 370/329 |
| 7,978,204 B2 * | 7/2011 | Ruge | 345/592 |
| 8,014,308 B2 * | 9/2011 | Gates et al. | 370/252 |
| 8,072,467 B2 * | 12/2011 | Bruckner et al. | 345/619 |
| 8,276,164 B2 * | 9/2012 | Munshi et al. | 719/328 |
| 8,319,781 B2 * | 11/2012 | Westerhoff et al. | 345/502 |
| 8,441,496 B1 * | 5/2013 | Maguire | 345/581 |
| 8,479,146 B2 * | 7/2013 | Thornton et al. | 717/103 |
| 8,610,725 B2 * | 12/2013 | Sandmel et al. | 345/501 |
| 2006/0184626 A1 | 8/2006 | Agapi et al. | |

(Continued)

FOREIGN PATENT DOCUMENTS

| | | |
|---|---|---|
| JP | 2001-094629 A | 4/2001 |
| JP | 2004-287889 A | 10/2004 |

(Continued)

OTHER PUBLICATIONS

Foster, Ian and Kesselman, Carl. "The Globus Project: A Status Report," Future Generation Computer Systems, vol. 15, Issues 5-6. Oct. 1999, pp. 607-621.*

Kumar, S. et al. "Second Life and the New Generation of Virtual Worlds," Computer, vol. 41, Issue 9, Sep. 2008, pp. 46-53.*

Silva, C. T. et al. "PVR: High Performance Volume Rendering," IEEE Computational Science and Engineering, vol. 3, Issue 4, Winter 1996, pp. 18-28.*

(Continued)

*Primary Examiner* — Melvin H Pollack
(74) *Attorney, Agent, or Firm* — Dorsey & Whitney LLP (57) ABSTRACT

Techniques for dynamic computation allocation are disclosed.

34 Claims, 7 Drawing Sheets

(56) References Cited

U.S. PATENT DOCUMENTS

| | | | |
|---|---|---|---|
| 2006/0267997 A1* | 11/2006 | Walls et al. | 345/581 |
| 2006/0267998 A1* | 11/2006 | Walls et al. | 345/581 |
| 2007/0229521 A1* | 10/2007 | Li et al. | 345/543 |
| 2009/0097628 A1* | 4/2009 | Yap et al. | 379/202.01 |
| 2010/0063992 A1* | 3/2010 | Ma et al. | 709/203 |
| 2010/0088126 A1* | 4/2010 | Iaia et al. | 705/5 |
| 2010/0153553 A1* | 6/2010 | Sheth et al. | 709/226 |
| 2010/0312826 A1* | 12/2010 | Sarosi et al. | 709/203 |
| 2011/0040878 A1* | 2/2011 | Luzzatti et al. | 709/226 |

FOREIGN PATENT DOCUMENTS

| | | | |
|---|---|---|---|
| JP | 2005-011346 A | 1/2005 | |
| JP | 2008-040763 A | 2/2008 | |
| WO | 2009/1076671 A2 | 6/2009 | |

OTHER PUBLICATIONS

Humphreys, Greg at al. "WireGL: A Scalable Graphics System for Clusters," ACM SIGGRAPH, Aug. 12-17, 2001, p. 129.*

Waldspurger, Carl. and Weihl, William. "Lottery Scheduling: Flexible Proportional-Share Resource Management," Proceedings of the 1st USENIX Conference on Operating Systems Design and Implementation (OSDI), Article No. 1, 1994.*

Samanta, Rudrajit et al. "Load Balancing for Multi-Projector Rendering Systems," Proceedings of the ACM SIGGRAPH/Eurographics Workshop on Graphics Hardware (HWWS), 1999, pp. 107-116.*

International Search Report mailed Nov. 2, 2010 for Application No. PCT/US2010/38367.

\* cited by examiner

DYNAMIC COMPUTATION ALLOCATION

BACKGROUND

In server/client systems, each of the server and the client may have computation and rendering capabilities. However, for any given application, computation and rendering may typically be done entirely by the server or by the client and designation of whether the computation is to be done by the server or the client may be static. In a thin client system, where computation is done at the server, although times of high connectivity may provide increased computation and rendering performance, during times of low connectivity, the client may detect slow performance. In a fat client system, where computation is done at the client, the client may be limited to computation and rendering at a lower quality.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

This disclosure is drawn, inter alia, to methods, apparatus, computer programs and systems related to dynamic computation allocation. The various embodiments may be applied to dynamic computation allocation between any two devices including a client and a server, a desktop and a handheld device, two devices having varying levels of connectivity, or two devices having varying levels of performance characteristics. For the purposes of illustration only, the discussion herein will focus especially on client/server environments.

In a client-server system, computation may be done at the client or at the server. Computation is intended to generally refer to any type of information processing. Computation may include, for example, game rendering. Rendering may include the imaging of 2D or 3D graphics. For gaming, rendering may be done in real time. Images may be rendered at the server and downloaded to the client or may be rendered at the client. More commonly, when rendered at the server, the images may be higher quality but the time to download may be high in low connectivity environments. The relative time for image download may be a function of size of the data file associated with the image and the connection speed of the client device. In contrast, when rendered at the client, the images may be low quality but the time to get the images may be low.

In accordance with various examples disclosed herein, computation may be done at the client or at the server and a dynamic determination may be made whether to do computation at the client or the server. This determination may be based at least in part on several factors. Further, after a determination is made, if the value of the factors used to make that determination change, a new determination may dynamically be made. Three factors that may be considered in dynamic computation allocation may include connection speed of the mobile device, remaining battery life of the mobile device and, in the case of images, acceptable quality of the images. These may be variously referred to as connectivity level, data quality level, and remaining battery life level. These factors are intended to be illustrative only and are not intended to be limiting.

Figure 1:
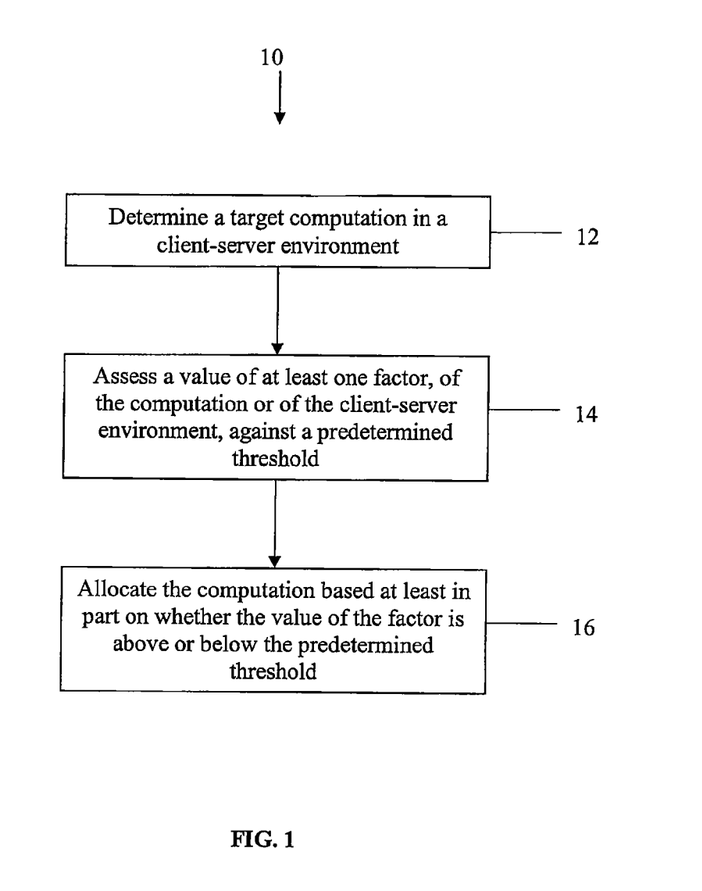
FIG. 1 is a flowchart illustrating a basic method for dynamic computation allocation in accordance with some embodiments of the present disclosure.

Accordingly, FIG. 1 is a flowchart illustrating a basic method 10 for dynamic computation allocation in accordance with some embodiments of the present disclosure. As shown, a target computation may be determined in a client-server environment [block 12]. This computation may be, for example, the rendering of specific images. A value of at least one factor, of the computation or of the client-server environment, may be assessed against a predetermined threshold [block 14]. An allocation of the computation may be made based at least in part on whether the value of the factor is above or below the predetermined threshold [block 16].

Figure 2A:
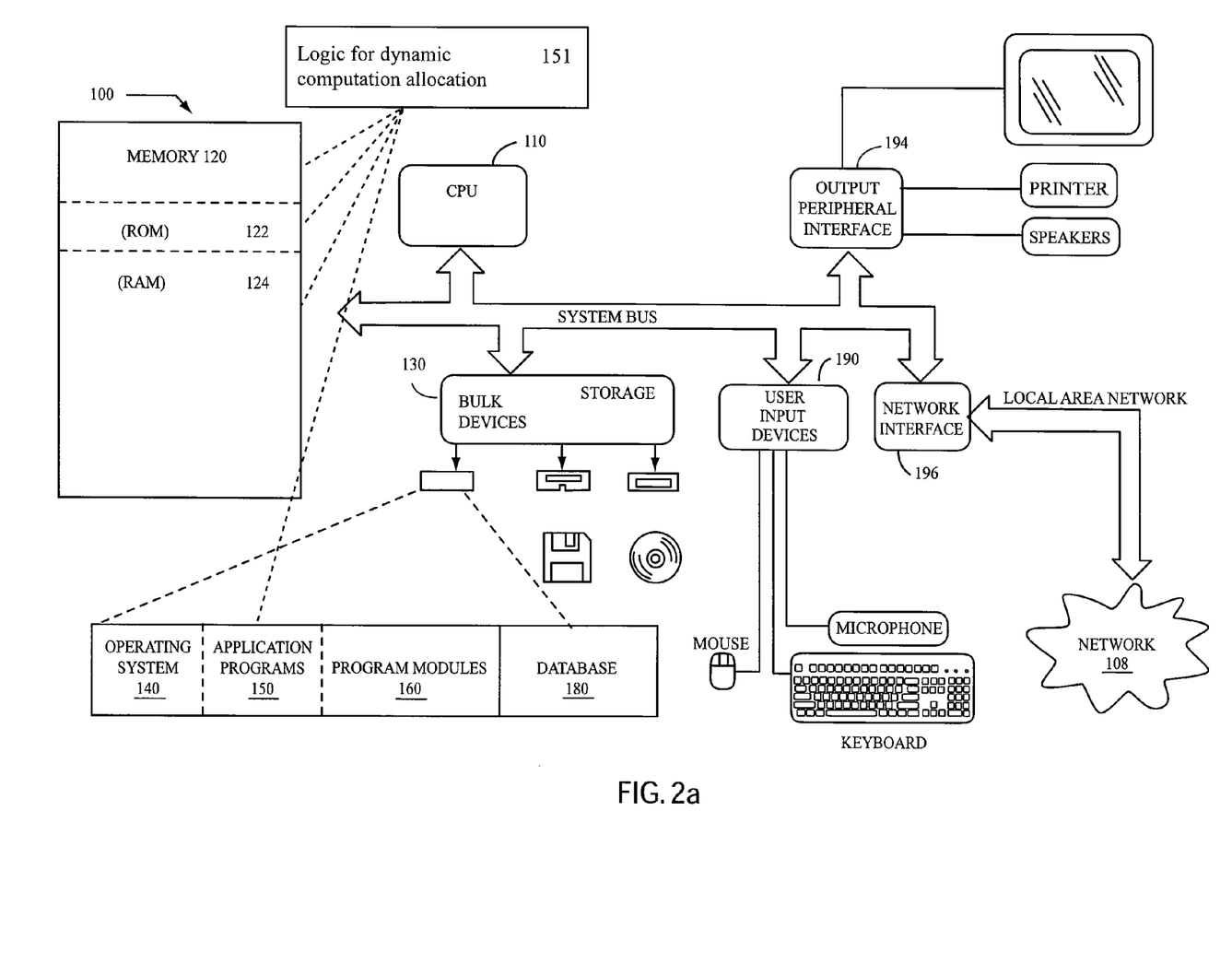
FIG. 2a is a schematic diagram illustrating an example computer for use with methods of dynamic computation allocation, in accordance with some embodiments of the present disclosure.

FIG. 2a is a schematic diagram illustrating an example computer for use with methods of dynamic computation allocation, in accordance with some embodiments of the present disclosure. In various examples disclosed herein, the computer 100 of the computing system may serve as the client or the server. FIG. 2a includes a computer 100, including a central processing unit (CPU), also referred to as a processor, 110, main memory 120 and one or more bulk storage devices 130. The processor 110 may generally be of any suitable configuration including but not limited to a microprocessor (µP), a microcontroller (µC), a digital signal processor (DSP), or any combination thereof. Thus, each processor 110 may include logic for executing program instructions as well as other functional blocks such as an arithmetic logic unit (ALU), a floating point unit (FPU), a digital signal processing (DSP) core, registers, accumulators, etc. The main memory 120, which may be any suitable form of memory including, but not limited to, volatile memory such as random access memory (RAM) 124, nonvolatile memory such as read only memory (ROM) 122, and flash memory storage, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile. Logic 151 or algorithms for dynamic computation allocation may be provided within the computer such as in the memory 120, ROM 122, RAM 124, application programs 150, or program modules 160.

The bulk storage devices 130 and their associated computer storage media provide storage of computer readable instructions, data structures, program modules and other data for the computer 100. The bulk storage devices 130 may also include an operating system 140, application programs 150, program modules 160, and a database 180. The computer 100 further includes user input devices 190 through which a user may enter commands and data. Input devices may include an electronic digitizer, a microphone, a keyboard and pointing device, commonly referred to as a mouse, trackball or touch pad. Other input devices may include a joystick, game pad, satellite dish, scanner, or the like.

These and other input devices may be connected to the processor 110 through a user input interface that is coupled to a system bus, or may be connected by other interfaces and bus structures, such as a parallel port, game port or a universal serial bus (USB). Computers such as computer 100 may also include other peripheral output devices such as speakers, which may be connected through an output peripheral interface 194 or the like.

The computer 100 may operate in a networked environment using logical connections to one or more computers, such as a remote computer coupled to network interface 196. The remote computer may be a personal computer, a server, a router, a network PC, a peer device or other common network node, and may include many or all of the elements described above relative to computer 100. The remote computer may be considered the other of the client or the server depending on the designation of the computer 100. Networking environments may be commonplace in offices, enterprise-wide area networks (WAN), local area networks (LAN), intranets and worldwide networks such as the Internet. Source and destination machines need not be connected by a network 108 or any other means, but instead, data may be migrated via any media capable of being written by the source platform and read by the destination platform or platforms. When used in a LAN or WLAN networking environment, the computer 100 is connected to the LAN through a network interface 196 or an adapter. When used in a WAN networking environment, computer 100 may include a modem or other means for establishing communications over the WAN, such as the Internet or network 108. It will be appreciated that other means of establishing a communications link between the computers may be used.

Figure 2B:
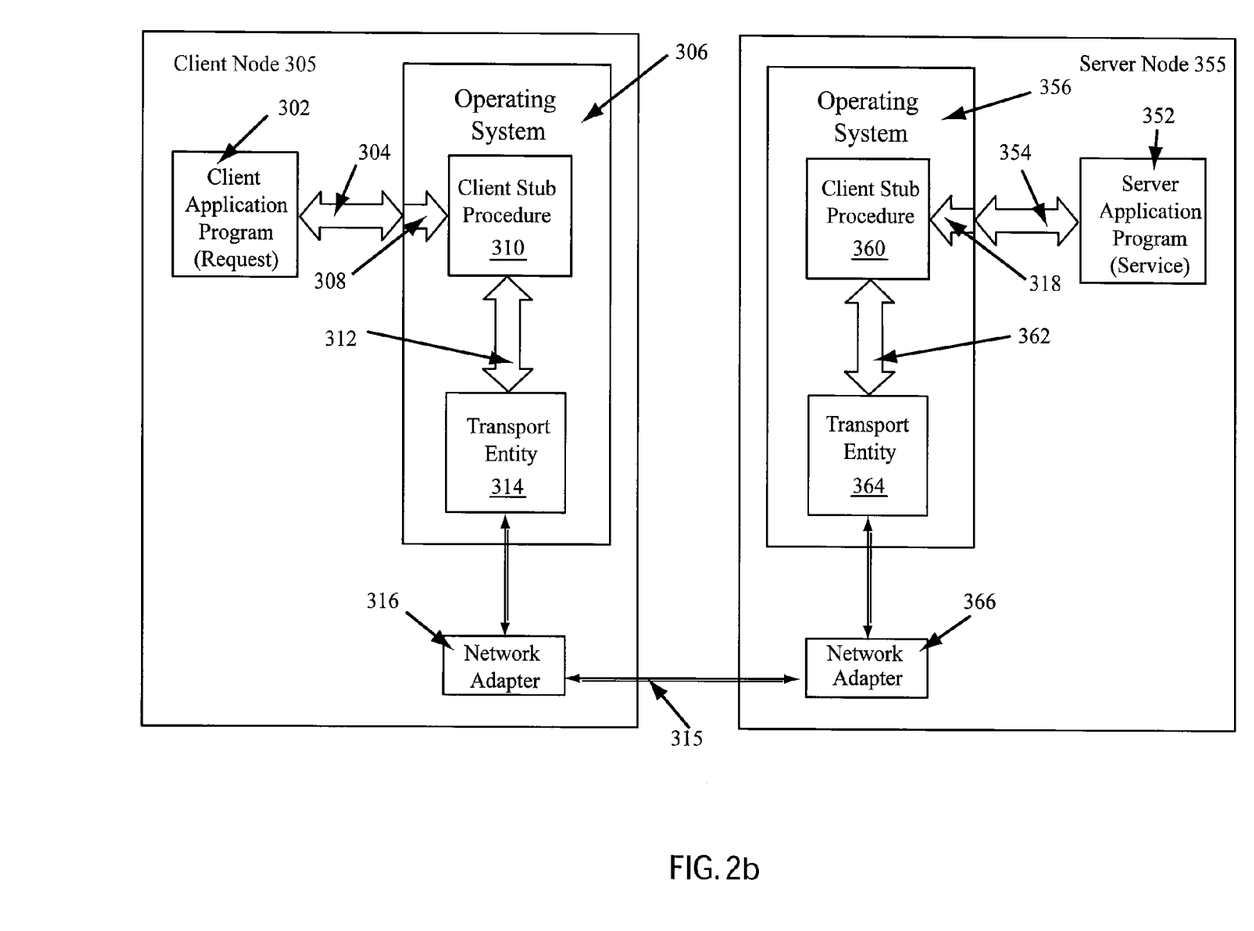
FIG. 2b is a block diagram illustrating an example client-server system suitable for use with dynamic computation allocation methods disclosed herein in accordance with some embodiments of the present disclosure.

FIG. 2b is a block diagram illustrating an example client-server system suitable for use with dynamic computation allocation methods disclosed herein in accordance with some embodiments of the present disclosure. The use of terms "client" and "server" herein is not intended to be limiting and the systems and methods disclosed herein may be applied to dynamic computation allocation between any two devices, including between standard a standard client and server, between a wireless device and a desktop, between two similar machines such as two desktops or notebook computers, or between any suitable devices wherein the performance characteristics may vary. Performance characteristics may include any characteristic or functioning that affects performance of the device including, for example, level of connectivity between devices, quality of rendered data, or remaining battery life. The logical connections between the devices may be wireless, dial-up, or by any other suitable means of communicating between the devices, wherein the level of connectivity may vary. An example client-server system includes a handheld telecommunications device (client) and a cellular phone service provider server or other content provider server (server).

For the purposes of this disclosure, specific reference is made to a system of computation allocation between a handheld telecommunications device and a server. A handheld telecommunications device (also known as mobile device or cell phone device) may, in some embodiments, be pocket-sized computing device, typically having a display screen with touch input or a miniature keyboard. In the case of the personal digital assistant (PDA), the input and output may be combined into a touch-screen interface.

The term "client" may refer to an application or system that accesses a remote service on another computer system, the server, by way of a network. The client-server model may be used on a worldwide network such as the Internet, where a user may connect to a service operating on a remote system through the internet protocol suite. Client-server systems frequently operate on two-tier architecture; the client acts as one tier and the server acts as another tier. This type of architecture may be arranged to facilitate sharing of files and resources between devices. More basic type of client-server architectures may employ two types of hosts: clients and servers. The client-server software architecture model may distinguishe client systems from server systems, which communicate over a computer network. In the client-server environment, the client makes data or other requests from the server.

The client/server model may be utilized in network computing. Many current business applications as well as Internet application protocols (such as hypertext transfer protocol (HTTP), simple mail transfer protocol (SMTP), Telnet, domain name system (DNS), and others) may use the client/server model. Individual instances of the client software may send data requests to one or more servers. In turn, the servers may accept these requests, process them, and return the requested information to the client. Although this concept may be applied for a variety of reasons to many different kinds of applications, the architecture may remain fundamentally the same.

Clients may generally be classified as either "fat clients" or "thin clients. Typically, computation allocation may be based at least in part on whether the client is a fat client or a thin client. Further, once designated as a fat client or a thin client, the designation may not typically be changed.

The term "fat client" (also known as a thick client or rich client) may refer to a client that performs the bulk of any data processing operations itself, and does not necessarily rely on the server. A fat client thus may operate at relatively fast speeds even in a low connectivity environment. Particularly with handheld device clients, however, the client may be configured to do computation or rendering at a lower quality because of limited system resources or to preserve battery life.

The term "thin client" may refer to a relatively minimal client. A thin client typically uses the resources of the server. Computation and rendering for a thin client may be done at the server and provided to the client by the server. Thus, for example, a thin client graphically displays pictures provided by an application server (the server performing the bulk of any required data processing). Performance of a thin client may depend on connectivity of the client to the network because, with processing done at the server, data sent to the client may be larger. A problem that exists with thin clients may be the slow speed of computation or rendering, or rather of receipt of the computed or rendered data, in slow connectivity environments. This leads to "lag". The term "lag" may refer to a condition where the computer freezes and than continues some time later. In many video games, lag may be undesirable because it disrupts normal gameplay.

FIG. 2b illustrates a typical client-server system 300 including a client node 305 and a server node 355. It is to be appreciated that FIG. 2b is intended only to illustrate a common client-server system and is no way intended to limit the types of client-server systems on which systems and methods of dynamic computation rendering disclosed herein may be used. As shown in FIG. 2b, each of the client node 305 and the server node 355 include operating systems 306, 356 and application programs 302, 352. Interactions between the application programs 302, 352 and operating systems 306, 356 are illustrated schematically by the two-headed arrows 304 and 354. This dual application program system may be used in any client-server system. Further, variations of this system are also contemplated.

In order to provide remote procedure call (RPC) functions, the application programs may interact (as shown schematically by arrows 308 and 318) with stub procedure software 310 and 360 by exchanging parameter requests. Each stub procedure, which may be generally associated with the respective operating system 306, 356, may arrange (or flattens) the parameters into a predetermined message format according to the computer type. An RPC may transfer data or request a server to perform an operation; accordingly, appropriate stub procedures may be specifically designed in each node to invoke, or respond to, such actions.

Transport entities 314, 364 are provided and may be the software within the transport layers of the protocol stacks. The transport entities 314, 316 may interact with the stub procedures (as shown schematically by arrows 312 and 362) to receive the messages, format them into packets and pass them over the network channel 315 via network adapters 316, 366. These adapters 316, 366 may incorporate some or all of the signal, electrical and mechanical characteristics, and interchange circuits, for interfacing with the network channel 315. The transport entities may be provided to facilitate reliable, cost-effective data transport between the client and server, independent of the physical network channel.

To implement an RPC system, the application program 302 of the client 305 may call the stub procedure 310 using a remote procedure call. The client stub procedure 310 may flatten the parameters, which may be passed to the transport entity 314 for transmission to the server 355 as a data packet. Since the RPC is a connectionless system, the transport entity typically attaches a header to the packet prior to forwarding it to the adapter 316 and onto the channel. When the packet arrives at the server, the adapter 366 may pass it to transport entity 364 and onto the server stub procedure 360, which may unflatten the parameters. The stub procedure 360 then may call the application program 352 and pass the parameters in any suitable manner.

After completing its work, the application program 352 may return a result. The stub procedure 360 may flatten the result into a message and passes it to the transport entity 364, where a reply packet may be formed and transferred to the client 305 over the channel 315. Upon receiving the reply packet, the transport entity 314 may pass it to the client stub procedure 310 for unflattening. Finally, the stub procedure may return the reply parameters to the application program 302.

Figure 3:
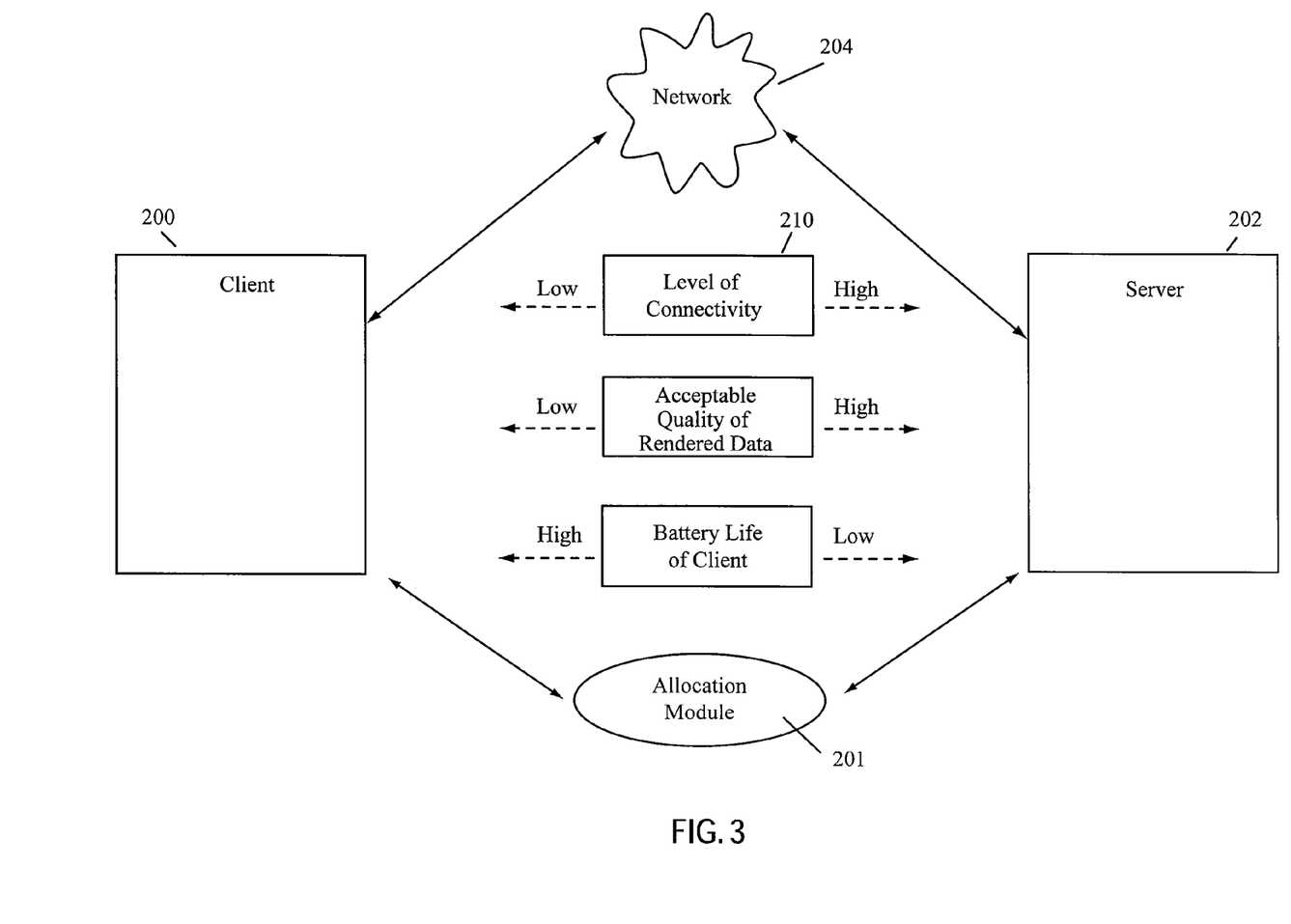
FIG. 3 is a schematic diagram illustrating a system for dynamic computation allocation in accordance with some embodiments of the present disclosure.

FIG. 3 is a schematic diagram illustrating a system for dynamic computation allocation in accordance with some embodiments of the present disclosure. As shown, the system may comprise a client-server system. The client 200 may be a handheld communications device and the server 202 may be a telecommunications service provider server, or other content provider server. Communication between the client 200 and the server 202 may be over a network 204, such as a wireless network or a worldwide network such as the Internet. In the example shown, both the client 200 and the server 202 may have rendering and modeling capabilities. An allocation module 201 may be provided for allocating computation between the client 200 and the server 202 based at least in part on at least one factor relating to performance characteristics. The allocation module 201 may be run on a processor of the client 200 or on a processor of the server 202.

For determining dynamic computation allocation, a number of factors relating to performance characteristics relating to the environment and/or the client 200 and the server 202 may be assessed. A first factor 210 may be level of connectivity 206. In a high connectivity environment, computation and rendering may be allocated to the server 202. In a high connectivity environment, the risk of lag or delay may be lessened and, in some examples, no other factors may be assessed. Thus, in a high connectivity environment, the server 202 may perform computations and rendering and may send down high quality data to the client 200, generally without lag. In a low connectivity environment, the risk of lag or delay may increase and, thus computations and rendering may be allocated to the client 202. Allocation to the client 200 generally may result in lower quality rendered data, but decreased or no lag. A second factor 212 relating to acceptable quality of rendered data thus may be assessed. If low quality rendered data is not acceptable, allocation may be to the server 202 despite a low connectivity environment. A third factor 214 that may be assessed is remaining battery life of the client 200. Generally, computation or rendering at the client may lead to faster depletion of client batteries. Thus this factor 214 may operate as an overriding factor where, notwithstanding allocations based at least in part on the first factor 210 and the second factor 212, if remaining battery life of the client is low, allocation is to the server 202. More or fewer factors or performance characteristics of the client, the server, or the environment may be assessed in dynamic computation allocation.

As may be appreciated from the embodiment of FIG. 3, the performance capabilities of the client 200 and the server 202 may be used at times when it is advantageous to the user of the client device. The factors may be continually reviewed during use of the client 200. The term "continuous" may include nonstop as well at predetermined intervals, periodic, or at other time periods. Thus, during a single session of use, computation allocation may switch. Determining the time of switch over may depend on the current levels of performance of the server and the client. The levels of performance may be based at least in part on several performance characteristics including, but not limited to, speed, rendering quality, memory availability, etc.

Figure 4:
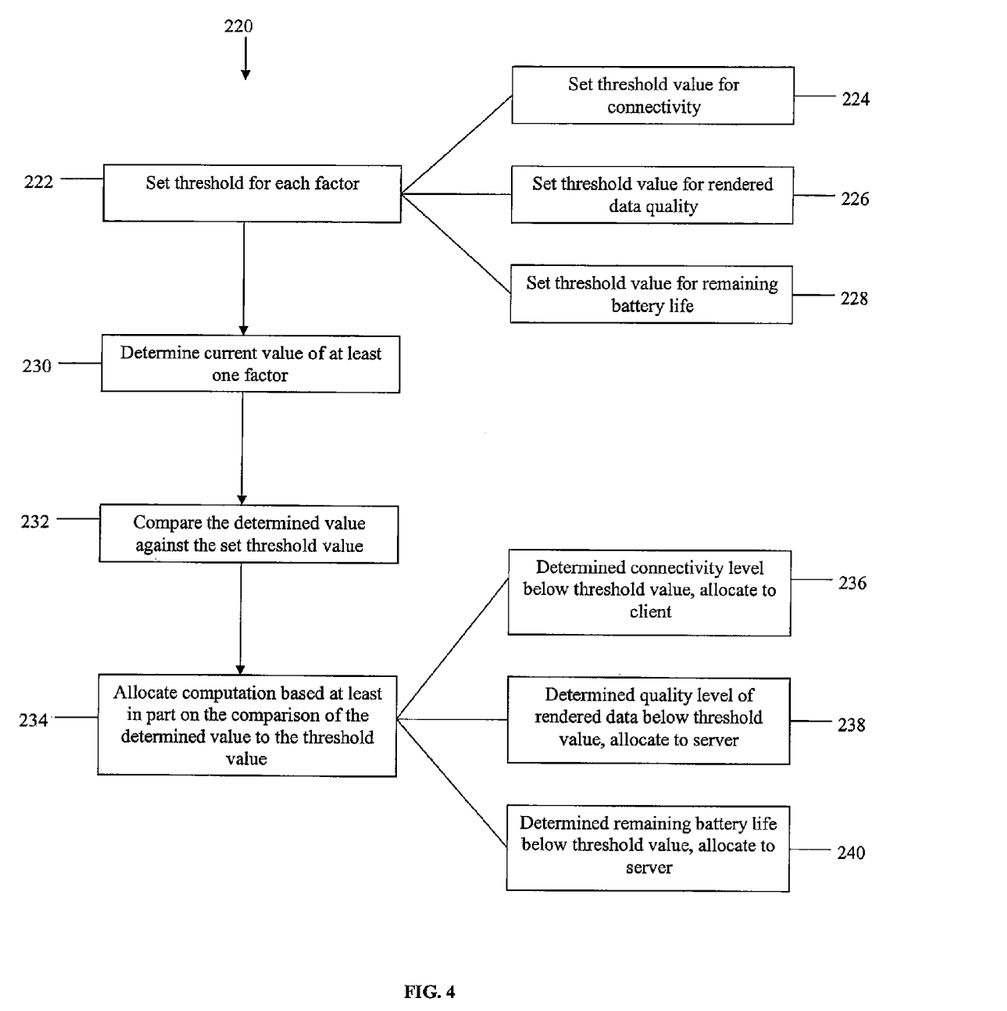
FIG. 4 is a flowchart illustrating a method for dynamic computation allocation in accordance with some embodiments of the present disclosure.

FIG. 4 is a flowchart illustrating a method for dynamic computation allocation 220 in accordance with some embodiments of the present disclosure. In allocating computation, one or more factors or performance characteristics may be assessed. Assessing such factors or performance characteristics may include comparing a current value of the factor to a predetermined threshold for that factor. As shown in FIG. 4, threshold values may be set for each factor to be considered [block 222]. These may include, for example, a threshold value for connectivity [block 224], a threshold value for rendered data quality [block 226], and a threshold value for remaining battery life [block 228]. Setting a threshold value may include setting of a threshold value by the client or presetting threshold values on the client or any reasonable variation of setting threshold levels.

The method of dynamic computation allocation 220 may also determine a current value for at least one factor [block 230] and compare the determined threshold value to the set threshold value [block 232]. An allocation of computation may be made based at least in part on the comparison of the determined value to the threshold value [block 234]. Thus, for example, if the determined connectivity level is below a set threshold value, allocation may be to the client [block 236]. If the determined quality level of rendered data would be below a set threshold value, allocation may be to the server [block 238]. If the determined remaining battery life is below a set threshold value, allocation may be to the client [block 240]. In some examples, the factors may be prioritized such that measurement of one of the factor values against a threshold value and a certain allocation based at least in part on that threshold value may override some or any other allocation. Thus, for example, if the remaining battery life is below a set threshold value, allocation may be to the server regardless of any other determined factor value. Similarly, if the determined quality of rendered data would be below a threshold value of an acceptable quality, allocation may be to the server regardless of any other determined factor value.

The method of dynamic computation allocation 220 may be run continually, periodically, or other during use of the client. Thus, for example, the method 220 may be executed non-stop, may be executed on a period basis, such as every five minutes, or may be executed upon initiation of a new rendering or computation process.

Figure 5:
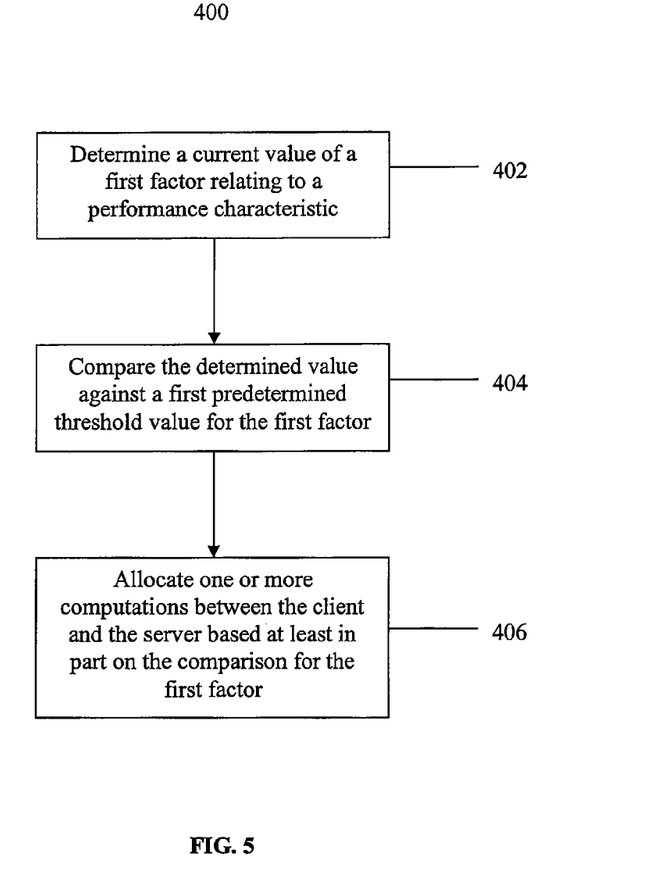
FIG. 5 is a flowchart illustrating a method for dynamic computation allocation in accordance with some embodiments of the present disclosure.

FIG. 5 is a flowchart illustrating a method for dynamic computation allocation 400 in accordance with some embodiments of the present disclosure. The method may include determining a current value of at least one factor [block 402]. In various examples, the factor may be related to connectivity, data quality, or remaining battery life. The method may include comparing the determined value against a predetermined threshold value for that factor [block 404] and allocating computation based at least in part on the comparison [block 406].

Figure 6:
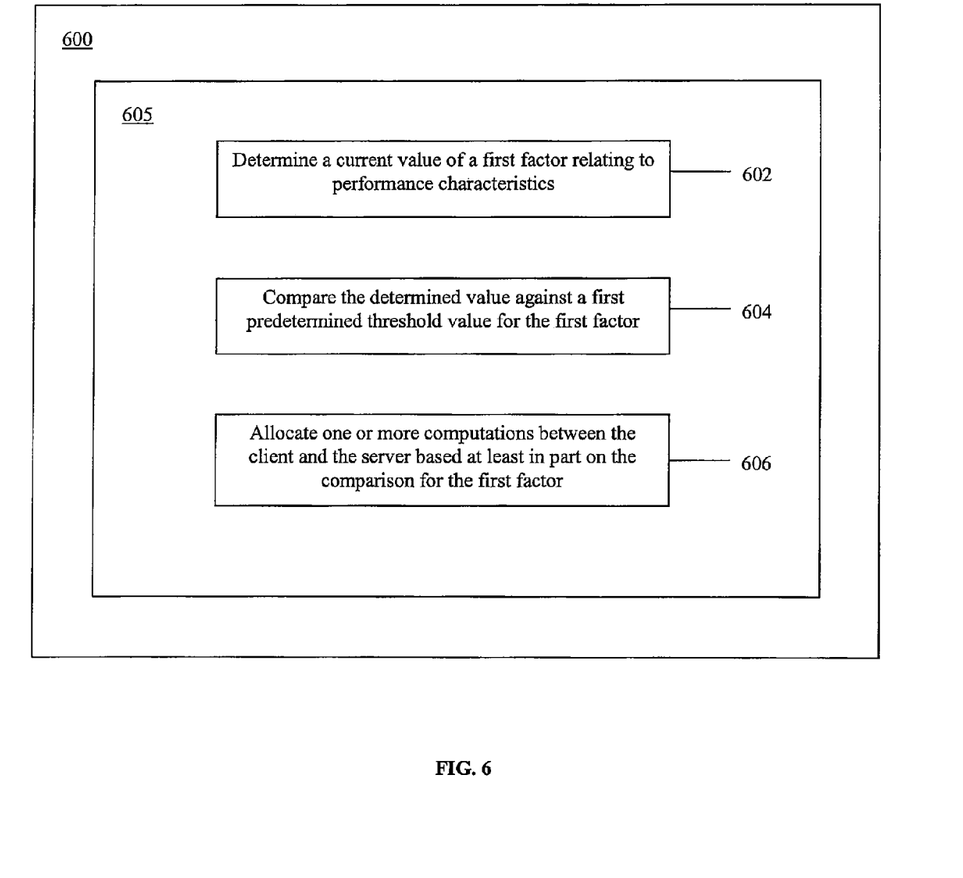
FIG. 6 is a schematic diagram of a computer system that may include a processor configured for performing an example of a method for dynamic computation allocation in accordance with some embodiments of the present disclosure.

FIG. 6 is a schematic diagram of a computer system that may include a processor configured for performing an example of a method for dynamic computation allocation in accordance with some embodiments of the present disclosure. In some examples, as shown in the schematic diagram of FIG. 6, a computer accessible medium 600 having stored thereon computer executable instructions 605 for performing a procedure for dynamic computation allocation is provided. The method may include determining a current value of at least one factor [block 602]. In various embodiments, the factor may be connectivity, data quality, or remaining battery life. The method may include comparing the determined value against a predetermined value for that factor [block 604] and allocating computation based at least in part on the comparison [block 606].

Accordingly, the present disclosure generally relates to systems and methods for dynamic computation allocation. The described systems may include a server having a processor capable of computation, a client in communication with the server and having a processor capable of computation, and allocation logic for allocating computation between the client and the server based at least in part on a current level of at least one factor relating to a performance characteristic.

In some example systems, the client may be a handheld telecommunication device. In some example systems, the allocation logic may be run on the processor of the server or may be run on the processor of the client. In other example systems, the at least on factor may be one of connectivity level, data quality, or remaining battery life.

The present disclosure also generally relates to methods for dynamic computation allocation. The described methods may include determining a current value of at least one factor relating to performance characteristics. The factor may be, for example, connectivity, data quality, or remaining battery life. The method then includes comparing the determined value against a predetermined value for that factor and allocating computation between the server and the client based at least in part on the comparison.

In some example methods, the factor relates to connectivity level and computation may be allocated to the server if the determined value for connectivity level is below the predetermined threshold value. In other example methods, the factor relates to data quality and computation may be allocated to the server if the determined value for data quality is inferior to the predetermined threshold value. In yet other example methods, the factor relates to remaining battery life and computation may be allocated to the server if the determined value for battery life is inferior to the predetermined threshold value. In additional example methods, a current value of a second factor may be determined, that determined value compared against a predetermine threshold value for the second factor, and computation allocated based at least in part on the comparison of the second factor, wherein the allocation based at least in part on the second factor overrides allocation based at least in part on the first factor. In various examples of this, the first factor may be connectivity and the second factor may be quality of computed value or the first factor may be connectivity and the second factor may be remaining battery life. In other examples, the method may include determining a target computation and allocating may be done to allocate the target computation. In some examples, allocating may be done continually.

The present disclosure also generally relates to computer accessible mediums having stored thereon computer executable instructions for performing a procedure for dynamic computation allocation. The described procedures may include determining a current value of at least one factor relating to performance characteristics, comparing the determined value against a predetermined value for that factor, and allocating computation between the server and the client based at least in part on the comparison.

In some further examples the factor may be one of connectivity level, data quality, or remaining battery life. In yet other examples, the procedure may include determining a current value of a second one factor, comparing the determined value against a predetermined threshold value for the second factor, and allocating computation based at least in part on the comparison of the second factor, wherein allocation based at least in part on the second factor may override allocation based at least in part on the first factor.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or coupled with, different other components. It is to be understood that such depicted architectures are merely intended as examples, and that in fact many other architectures may be implemented which achieve the same functionality. In a conceptual sense, any arrangement of components to achieve the same functionality is effectively "associated" such that the target functionality is achieved. Hence, any two components herein combined to achieve a particular functionality may be seen as "associated with" each other such that the target functionality is achieved, irrespective of architectures or intermedial components. Likewise, any two components so associated may also be viewed as being "operably connected", or "operably coupled", to each other to achieve the target functionality, and any two components capable of being so associated may also be viewed as being "operably couplable", to each other to achieve the target functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for dynamic computation allocation between a client and a server, comprising:
   determining a current value of at least one factor relating to performance characteristics wherein the at least one factor includes remaining battery life of the client;
   comparing the determined value against a predetermined threshold value for the at least one factor that includes the remaining battery life of the client;
   allocating a rendering computation far rendering an image between the client and the server based on the comparison; and
   if computation is allocated to the server, returning a result of the rendering computation, including at least a portion of the image rendered using the rendering computation, to the client, wherein returning a result of the rendering computation comprises exchanging parameter requests between the client and the server through stub procedure software.

2. The method of claim 1, wherein the at least one factor additionally includes connectivity level.

3. The method of claim 2, wherein the computation is allocated to the server if the determined value for connectivity level is interior to the predetermined threshold value.

4. The method of claim 1, wherein the at least one factor additionally includes data quality.

5. The method of claim 2, wherein the computation is allocated to the server if the determined value for data quality is inferior to the predetermined threshold value.

6. The method of claim 1, wherein the computation is allocated to the server if the determined value for battery life is inferior to the predetermined threshold value, and wherein the computation is allocated to the client if the determined value for battery life is superior to the predetermined threshold value and a data quality is superior to another predetermined threshold value.

7. A method for dynamic computation allocation between a client and a server, comprising:
   determining a current value of at least one first factor relating to performance characteristics;
   comparing the determined value against a predetermined threshold value for the first factor;
   determining a current value of a battery life of the client;
   comparing the determined value of the battery life of the client against a predetermined threshold value for the battery life;
   allocating a rendering computation for rendering an image between the client and the server based on the comparisons, wherein an allocation determined based on the battery life overrides allocation based on the first factor; and
   if the rendering computation is allocated to the server, returning a result of the rendering computation to the client, including at least a portion of the image rendered using the rendering computation, wherein returning a result of the rendering computation comprises exchanging parameters between the client and the server through stub procedure software.

8. The method of claim 7, wherein the first factor is connectivity.

9. The method of claim 1, further comprising determining a desired computation, wherein allocating is conducted to allocate the desired computation.

10. The method of claim 1, wherein allocating is done continually.

11. A system for dynamic computation allocation, comprising:
   a server having a processor capable of rendering at least a portion of an image;
   a client in communication with the server, the client having a processor capable of rendering at least a portion of an image;
   allocation logic configured for allocating rendering between the server and the client based on a current value of at least one factor including remaining battery life of the client; and
   wherein the server is configured to return a result of the rendering, including at least a portion of a rendered image, to the client if the computation is allocated to the server, and wherein returning a result of the rendering from the server comprises exchanging parameters between the client and the server through stub procedure software.

12. The system of claim 11, wherein the client is a handheld telecommunication device.

13. The system of claim 11, wherein the allocation logic is run on the processor of the server.

14. The system of claim 11, wherein the allocation logic is run on the processor of the client.

15. A computer accessible medium having stored thereon computer executable instructions for performing a procedure for dynamic computation allocation, the procedure comprising:
   determining a current value of at least one factor including remaining battery life;
   comparing the determined value against a predetermined threshold value for that factor; and
   allocating a rendering computation for rendering an image between the client and the server based on the comparison; and
   if the rendering computation is allocated to the server, returning a result of the rendering computation to the client, including at least a portion of the image rendered using the rendering computation, wherein returning a result of the rendering computation comprises exchanging parameters between the client and the server through stub procedure software.

16. The computer accessible medium of claim 15, wherein the at least one factor further includes connectivity level.

17. A computer accessible medium having stored thereon computer executable instructions for performing a procedure for dynamic computation allocation, the procedure comprising:
   determining a current value of at least one first factor relating to performance characteristics;
   comparing the determined value against a predetermined threshold value for that factor;
   determining a current value of a remaining battery life;
   comparing the determined value against a predetermined threshold value for the remaining battery life; and
   allocating a rendering computation for rendering an image between the client and the server based on the comparisons, wherein allocation based on the remaining battery life may override allocation based on the first factor; and
   if the rendering computation is allocated to the server, returning a result of the rendering computation to the client, including at least a portion of the image rendered using the rendering computation, wherein returning a result of the rendering computation comprises exchanging parameters between client software and server software through stub procedure software.

18. The computer accessible medium of claim 17, wherein the at least one factor includes connectivity.

19. The method of claim 1 further comprising, switching an allocation between the client and the server during a single session of use.

20. The method of claim 19 wherein said switching an allocation comprises determining a time of switch over based, at least in part, on current levels of performance of the server and the client.

21. The system of claim 11 wherein the allocation logic is further configured to switch an allocation between the client and the server during a single session of use.

22. The system of claim 21 wherein the allocation logic is configured to switch the allocation at least in part by determining a time of switch over based on current levels of performance of the server and the client.

23. The method of claim 1, wherein the at least one factor relating to performance characteristics comprises at least on factor relating to performance characteristics of the client and at least one factor relating to performance characteristics of the server.

24. The system of claim 11, wherein the at least one factor comprises at least one factor relating to the client and at least one factor relating to the server.

25. The method of claim 1 wherein the stub procedure software is configured to flatten or unflatten the parameters according to a predetermined message format.

26. The method of claim 7 wherein the stub procedure software is configured to flatten or unflatten the parameters according to a predetermined message format.

27. The system of claim 11, wherein the stub procedure software is configured to flatten or unflatten the parameters according to a predetermined message format.

28. The computer accessible medium of claim 15, wherein the stub procedure software is configured to flatten or unflatten the parameters according to a predetermined message format.

29. The computer accessible medium of claim 17, wherein the stub procedure software is configured to flatten or unflatten the parameters according to a predetermined message format.

30. The method of claim 1, wherein allocating a rendering computation for rendering an image between the client and the server based on the comparison further comprises assigning at least a portion of the rendering computation to be performed by the client and assigning any remaining portion of the rendering computation to be performed by the server.

31. The method of claim 7, wherein allocating a rendering computation for rendering an image between the client and the server based on the comparisons further comprises assigning at least a portion of the rendering computation to be performed by the client and assigning any remaining portion of the rendering computation to be performed by the server.

32. The system of claim 11 wherein allocation logic is further configured to assign at least a portion rendering to the client and to assign any remaining portion of the rendering to the server.

33. The computer accessible medium of claim 15, wherein allocating a rendering computation for rendering an image between the client and the server based on the comparison further comprises assigning at least a portion of the rendering computation to be performed by the client and assigning any remaining portion of the rendering computation to be performed by the server.

34. The computer accessible medium of claim 17, wherein allocating a rendering, computation for rendering an image between the client and the server based on the comparisons further comprises assigning at least a portion of the rendering computation to be performed by the client and assigning any remaining portion of the rendering computation to be performed by the server.

* * * * *

UNITED STATES PATENT AND TRADEMARK OFFICE
CERTIFICATE OF CORRECTION

PATENT NO.        : 8,838,797 B2
APPLICATION NO.   : 12/500667
DATED             : September 16, 2014
INVENTOR(S)       : Wolfe et al.

Page 1 of 1

It is certified that error appears in the above-identified patent and that said Letters Patent is hereby corrected as shown below:

In the Claims,

In Column 12, Line 12, in Claim 1, delete "far" and insert -- for --, therefor.

In Column 12, Line 26, in Claim 3, delete "interior" and insert -- inferior --, therefor.

In Column 14, Line 66, in Claim 34, delete "rendering," and insert -- rendering --, therefor.

Signed and Sealed this
Third Day of March, 2015

Michelle K. Lee
*Deputy Director of the United States Patent and Trademark Office*